US009307516B2

(12) United States Patent
Castillo et al.

(10) Patent No.: US 9,307,516 B2
(45) Date of Patent: Apr. 5, 2016

(54) METHOD AND SYSTEM FOR LOCATING A FEMTOCELL USING MEASUREMENT REPORTS

(75) Inventors: Manuel del Castillo, Madrid (ES); David Albert Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 519 days.

(21) Appl. No.: 12/754,099

(22) Filed: Apr. 5, 2010

(65) Prior Publication Data

US 2011/0201349 A1    Aug. 18, 2011

Related U.S. Application Data

(60) Provisional application No. 61/304,024, filed on Feb. 12, 2010.

(51) Int. Cl.
*H04W 64/00* (2009.01)
*H04W 84/04* (2009.01)

(52) U.S. Cl.
CPC .......... *H04W 64/003* (2013.01); *H04W 84/045* (2013.01)

(58) Field of Classification Search
CPC ........... H04W 84/0456; H04W 84/045; G01S 5/0009–5/009; G01S 5/0284; G01S 5/0289
USPC .......................... 370/328–338; 455/456.1–457
See application file for complete search history.

(56) References Cited

U.S. PATENT DOCUMENTS

| 7,577,443 | B1 | 8/2009 | Moll | |
| 2008/0188243 | A1* | 8/2008 | Giustina et al. | 455/456.6 |
| 2008/0293433 | A1 | 11/2008 | Wallis | |
| 2008/0299992 | A1* | 12/2008 | Eitan et al. | 455/456.5 |
| 2008/0318596 | A1* | 12/2008 | Tenny | 455/456.2 |
| 2009/0124235 | A1 | 5/2009 | Bosch | |
| 2009/0311987 | A1 | 12/2009 | Edge | |
| 2010/0222006 | A1* | 9/2010 | Peisa et al. | 455/67.7 |

FOREIGN PATENT DOCUMENTS

WO    WO2008/093103 A2    8/2008

OTHER PUBLICATIONS

European Patent Office, Communication with Extended European Search Report in Application No. 11000904.0, dated May 27, 2011 (8 total pages).

* cited by examiner

*Primary Examiner* — Pao Sinkantarakorn
(74) *Attorney, Agent, or Firm* — Sterne, Kessler, Goldstein & Fox P.L.L.C.

(57) ABSTRACT

A Femtocell measures power from a serving and/or neighboring base stations in a radio access network specified in, for example, 3GPP, 3GPP2 and/or WiMAX. The power measurements are transmitted over a broadband IP network to a location server coupled to an associated mobile core network. Related location information comprising reference positions and/or actual location of the Femtocell are received from the location server over the broadband IP network. The Femtocell generates measurement reports of a serving and/or neighboring base stations in the radio access network. The generated measurement reports are transmitted to the location server over the broadband IP network. The location server identifies the reference positions of the Femtocell from a reference database based on the received measurement reports for calculating the location of the Femtocell by the location server and/or by the Femtocell itself. The calculated location of the Femtocell is used to update the reference database.

19 Claims, 5 Drawing Sheets

METHOD AND SYSTEM FOR LOCATING A FEMTOCELL USING MEASUREMENT REPORTS

CROSS-REFERENCE TO RELATED APPLICATIONS/INCORPORATION BY REFERENCE

This patent application makes reference to, claims priority to and claims the benefit from U.S. Provisional Patent Application Ser. No. 61/304,024 filed on Feb. 12, 2010.

This patent application makes reference to U.S. application Ser. No. 12/690,007 filed on Jan. 19, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for locating a Femtocell using measurement reports.

BACKGROUND OF THE INVENTION

Location-based service (LBS) is a value-added service provided by various wireless networks such as 3GPP, 3GPP2, and WiMAX. Acquiring knowledge of a user's location enables various LBS applications such as, for example, enhanced 911 (E-911), location-based 411, location-based messaging and/or friend finding. A user's location is determined in different ways such as, for example, using network-based technology, using terminal-based technology, and/or hybrid technology (a combination of the former technologies). Many positioning technologies such as, for example, Cell of Origin (COO), Time of Arrival (TOA), Observed Time Difference of Arrival (OTDOA), Enhanced Observed Time Difference (E-OTD) as well as the satellite-based systems such as the Global Navigation Satellite Systems (GNSS), or Assisted- GNSS (A-GNSS), are in place to estimate the location of, for example, a mobile device and convert it into a meaningful longitude, and latitude coordinates for LBS applications. The LBS applications may be provided via the wireless networks and/or Femtocells. A Femtocell, originally known as an Access Point Base Station, is a small base station, typically designed for use in a home or small business. A Femtocell connects to the service provider's network via a broadband (such as DSL or cable) IP network. A Femtocell allows service providers to extend service coverage indoors, especially where access would otherwise be limited or unavailable. A Femtocell incorporates some of the functionality of a typical base station but extends it to allow a simpler, self contained deployment. For example, a UMTS Femtocell contains a Node B, RNC and GPRS Support Node (SGSN) with Ethernet for backhaul.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for locating a Femtocell using measurement reports, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for locating a Femtocell using measurement reports. In various embodiments of the invention, a Femtocell is operable to perform or carry out power measurements on a serving macro base station and/or one or more neighboring macro base stations in a radio access network specified in, for example, 3GPP, 3GPP2 and/or WiMAX. The Femtocell is operable to transmit the power measurements over a broadband IP network to a location server coupled to a mobile core network, which the radio access network is associated to. The Femtocell is configured to receive location information related to the Femtocell from the location server over the broadband IP network. The received location information comprises one or more reference positions of the Femtocell and/or actual location of the Femtocell. The received location information may be stored in a Femtocell reference database, which is coupled to the Femtocell internally or externally, to support location-based applications. The Femtocell is operable to generate measurement reports using the measurements so as to determine the actual location of the Femtocell. The Femtocell transmits the generated measurement reports to the location server over the broadband IP network.

The location server may be operable to identify the one or more reference positions corresponding to macro base stations detected by the Femtocell from a reference database, based on the measurement reports received from the Femtocell, In instances where a client-assisted Femtocell locating is implemented, the Femtocell is configured to receive the one or more reference positions corresponding to macro base stations detected by the Femtocell from the location server over the broadband IP network. The Femtocell calculates the location of the Femtocell using the received one or more reference positions. The Femtocell is operable to transmit the calculated location of the Femtocell to the location server so as to update the reference database. In instances where a server-assisted Femtocell locating is implemented, the location server calculates the location of the Femtocell using the identified one or more reference positions. The location server is operable to update the reference database using the calculated location of the Femtocell. The location server is also operable to transmit the calculated location of the Femtocell to the Femtocell over the broadband IP network.

Figure 1:
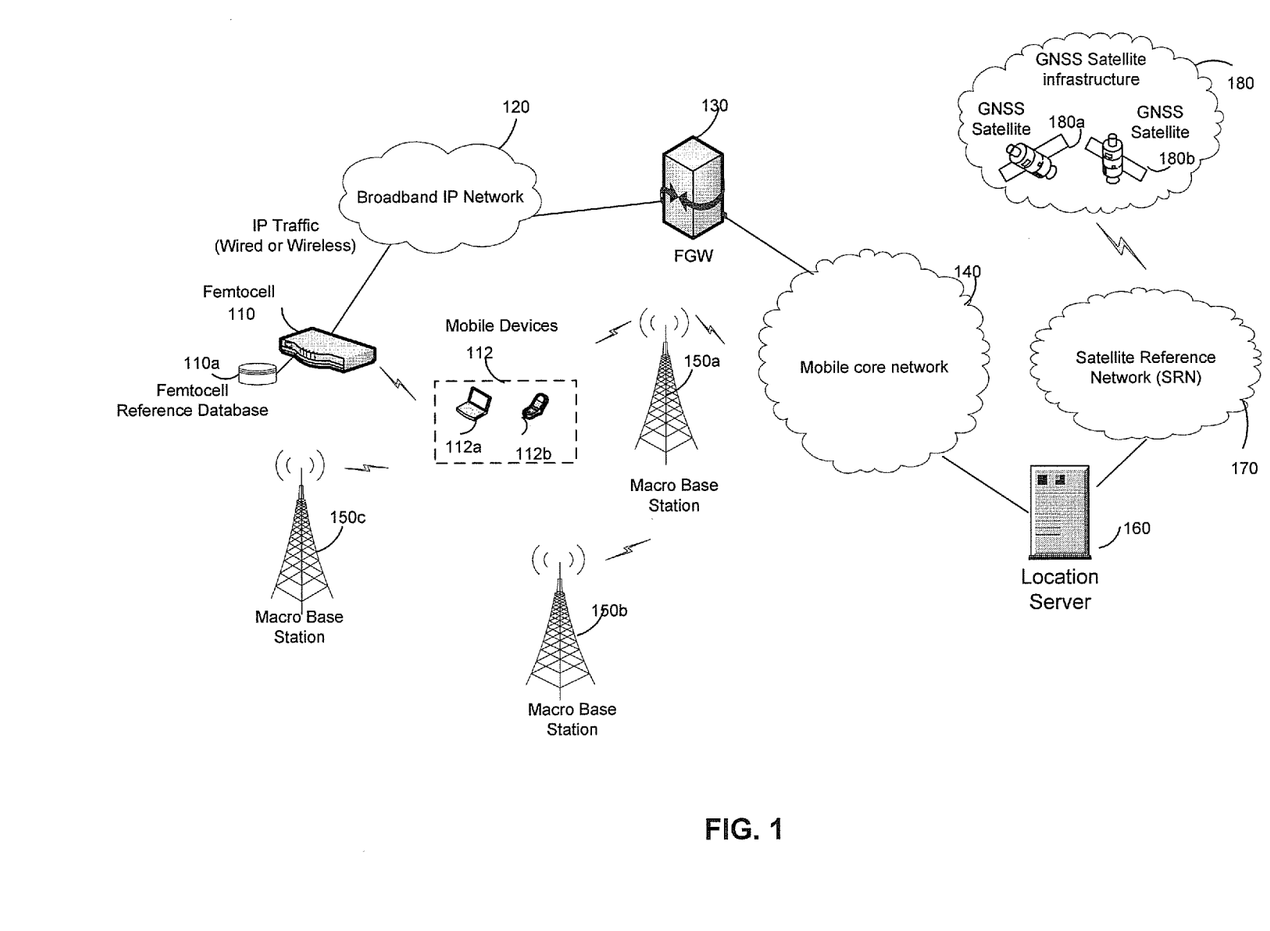
FIG. 1 is a diagram illustrating an exemplary Femtocell communication system that is operable to determine the location of a Femtocell using measurement reports, in accordance with an embodiment of the invention.

FIG. 1 is a diagram illustrating an exemplary Femtocell communication system that is operable to determine the location of a Femtocell using measurement reports, in accordance with an embodiment of the invention. Referring to FIG. 1, there is shown a Femtocell communication system 100. The Femtocell communication system 100 comprises a Femtocell 110, a broadband IP network 120, a plurality of standards-based mobile devices, of which mobile devices 112a-112b are illustrated, a Femtocell gateway (FGW) 130, a mobile core network 140, a plurality of standard-based macro base stations, of which macro base stations 150a-150c are illustrated, a location server 160, a satellite reference network (SRN) 170 and a GNSS satellite infrastructure 180. The GNSS satellite infrastructure 180 comprises a plurality of GNSS satellites, of which GNSS satellites 180a-180b are illustrated.

The Femtocell 110 may comprise suitable logic, circuitry, interfaces and/or code that are operable to communicate wirelessly with the plurality of standards-based mobile devices such as the mobile devices 112a-112b utilizing one or more industry telecommunication standards such as 3rd Generation Partnership Project (3GPP), 3rd Generation Partnership Project 2 (3GPP2), Worldwide Interoperability for Microwave Access (WiMAX), extensions thereto, and/or variants thereof. The Femtocell 110 may function as a low power standard based macro base station typically designed for use in residential or small business environments. The Femtocell 110 comprises a low-power standard air interface specified in, for example, 3GPP, 3GPP2 and/or WiMAX, and a broadband interface. The Femtocell 110 accesses to the mobile core network 140 via the broadband interface. The Femtocell 110 connects and communicates to standard-based communication devices such as the mobile device 112a using air interface protocols specified in, for example, 3GPP, 3GPP2 and/or WiMAX. From the view point of the standards-based mobile devices, the Femtocell 110 may appear as another macro base station in an associated radio access network. In this regard, the Femtocell 110 may be configured to support various standards-based mobile devices such as, for example, 3GPP-based mobile devices, 3GPP2-based mobile devices and/or WiMAX-based mobile devices. The Femtocell 110 may be operable to communicate with associated standards-based mobile devices such as the mobile devices 112a-112b using point-to-point and/or point-to-multipoint connections. The Femtocell 110 may be coupled with the broadband IP network 120 over a wired or wireless connection, which is used as an IP backhaul for the Femtocell 110. The Femtocell 110 may be operable to communicate with the mobile core network 140 via the broadband IP network 120 to access various mobile services such as location-based services provided by the mobile core network 140.

The Femtocell 110 may be integrated within an existing wireless network such as a 3GPP network to work seamlessly with existing 3GPP-based mobile devices located in a service area of the 3GPP network. The Femtocell 110 may be operable to register with the FGW 130 so as to gain access the mobile core network 140 for mobile services. The Femtocell 110 may be authenticated and authorized by the mobile core network 140 so as to receive mobile services provided by the mobile core network 140. The Femtocell 110 may be operable to duplicate the functionality of a standard-based macro base station such as, for example, 3GPP-based base stations, 3GPP2-based base stations, and/or WiMAX-based base stations. The Femtocell 110 may be configured to establish connections and associated sessions with standards-based mobile devices such as the mobile devices 112a-112b using air interface protocols specified in, for example, 3GPP, 3GPP2, and/or WiMAX. The Femtocell 110 may be operable to assign air-interface resources, perform scheduling, and/or maintain various established connections or links in a radio network specified in, for example, 3GPP, 3GPP2, and/or WiMAX, with the mobile devices 112a-112b. In this regard, the Femtocell 110 may be operable to perform measurements for determining link quality in the radio network.

The Femtocell 110 may be operable to measure various characteristics of the radio network by performing exemplary measurements comprising intra-frequency measurements, inter-frequency measurements and/or inter-RAT measurements. The intra-frequency measurements comprise provides a measure of the power on the frequency currently in use in the radio network. The inter-frequency measurements comprise measuring the power on one or more neighbor frequencies in the radio network. The inter-RAT measurements comprise measuring the power on one or more frequencies in different radio access networks. Depending on implementation, the measurements may be utilized to determine a location for the Femtocell 110 by the Femtocell 110 and/or by the location server 160. In instances where the Femtocell 110 is configured to determine its own location utilizing the corresponding measurements, the determined location may be stored in a Femtocell location database 110a that is internally or externally coupled to the Femtocell 110. In instances where the location of the Femtocell is determined at the location server 160, the Femtocell 110 may be operable to communicate the measurements to the location server 160 via the mobile core network 140 as, for example, Femtocell measurement reports, via the broadband IP network 120. The Femtocell measurement reports, just like a Measured Results List (MRL) specified in 3GPP, may be utilized by the location server 160 to determine the location of the Femtocell 110. In this regard, the Femtocell 110 may be operable to receive the determined location for the Femtocell 110 from the location server 160. The received location for the Femtocell 110 may be stored in the Femtocell location database 110a to support location-based services. In addition, the Femtocell measurement reports may also be utilized for dynamic network planning and/or the distribution of radio resources (radio resource management).

Standards-based mobile devices such as the mobile device 112a may comprise suitable logic, circuitry, interfaces and/or code that are operable to receive and/or transmit radio frequency signals using air interface protocols in a radio access network (RAN) specified in, for example, 3GPP, 3GPP2, or WiMAX. The mobile device 112a may be operable to communicate with Femtocells such as the Femtocell 110 and standard-based macro base stations such as the macro base station 150a using the same air interface protocols specified for the RAN. Exemplary air interface protocols may comprise air interface protocols specified in, for example, CDMA, GSM, UMTS, LTE and WiMax. The mobile device 112a may be operable to access mobile services provided by the mobile core network 140 via the Femtocell 110 and/or the base station 150a. In instances where the mobile device 112a comes within range, namely a service area, of the Femtocell 110, the mobile device 112a may be authorized by the Femtocell 110 to access mobile service provided by the mobile core network 140 via the broadband IP network 120. By being close to the Femtocell 110, the mobile device 112a may be operable to utilize less power to access the same mobile services provided by the mobile core network 140. Otherwise, the mobile device 112a may be served by a standard-based macro base station such as the macro base station 150a.

The broadband IP network 120 may comprise suitable logic, circuitry, interfaces and/or code that are operable to distribute content of various mobile services provided by the mobile core network 140 over the Internet. The broadband IP network 120 may be operable to deliver a variety of mobile services provided by the mobile core network 140, via broadband communication, to users efficiently and cost-effectively. The broadband IP network 120 may be operable to provide broadband IP connections to enable various Femtocells such as the Femtocell 110 to communicate IP traffic with, for example, the PSTN and/or other wired or wireless devices, via the mobile core network 140. The broadband IP connections may comprise, for example, a digital subscriber line (DSL), a T1/E1 line, the cable television infrastructure, the satellite television infrastructure, and/or a satellite broadband internet connection. The IP traffic over the broadband IP connections may be communicated to the mobile core network 140 via the FGW 130.

The FGW 130 may comprise suitable logic, circuitry, interfaces and/or code that are operable to protect the integrity of the operators' core networks, such as the mobile core network 140, from the public environment of the Internet, protect the integrity of user traffic, and support seamless transitions between the macro and Femtocell networks. The FGW 130 may be communicatively coupled to a plurality of Femtocells such as the Femtocell 110, and to the mobile core network 140. The FGW 130 may be configured to communicate with the mobile core network 140 using a standards-based interface such as a radio network controller interface. For example, for a UMTS-based Femtocell, the FGW 130 may be operable to apply a UTRAN Iu-cs interface for circuit switched voice services and a UTRAN Iu-ps interface for packet data services such as GPRS. In this manner, the FGW 130 may appear to a UTRAN core network as a traditional UTRAN network element such as, for example, a radio network controller (RNC) and may be managed and operated as such.

The mobile core network 140 may comprise suitable logic, circuitry, interfaces and/or code that are operable to provide mobile services to standards-based mobile devices such as the mobile devices 112a-112b using various communication technologies such as, for example, Global System for Mobile communications (GSM), General Packet Radio Services (GPRS), Universal Mobile Telecommunications System (UMTS), Enhanced Data rates for GSM Evolution (EDGE), Enhanced GPRS (EGPRS), 3GPP Long Term Evolution (LTE) and/or WiMAX. The mobile core network 140 may be operable to communicate various mobile services such as a location-based service via standard-based macro base stations such as the macro base station 150a and/or Femtocells such as the Femtocell 110 with standards-based mobile devices such as the mobile devices 112a-112b.

The mobile core network 140 may be operable to provide reliable transfer of information and manage connections between exemplary entities such as, for example, service providers and/or radio access networks. The mobile core network 140 may be operable to provide network related control functions for addressing, establishing, and terminating connections, and/or network management functions. The network management functions may comprise signaling for network configurations, performance and fault monitoring, billing and accounting purposes. For example, the mobile core network 140 may be operable to command the FGW 130 to allocate resources for a particular task such as delivering a particular mobile service to an intended standards-based mobile device such as the mobile device 112a. The command from the mobile core network 140 to the FGW 130 may comprise identification information of the intended standards-based mobile device and/or detected Femtocells such as the Femtocell 110. In this regard, the mobile core network 140 may be operable to deliver mobile services to an intended mobile device such as the mobile device 112a via a detected Femtocell such as the Femtocell 110 and/or a standard-based macro base station such as the macro base station 150a.

A standard-based macro base station such as the macro base station 150a may comprise suitable logic, circuitry, interfaces and/or code that are operable to manage and schedule communication resources in an uplink direction and/or downlink direction to users of various standards-based mobile devices such as the mobile devices 112a-112b. The macro base station 150a may be operable to receive and/or transmit radio frequency signals from and/or to associated standards-based mobile devices such as the mobile devices 112a-112b using air interface protocols specified in, for example, CDMA, GSM, UMTS, LTE and/or WiMax radio access networks.

The location server 160 may comprise suitable logic, circuitry, interfaces and/or code that are operable to access the satellite reference network (SRN) 170 to collect GNSS satellite data by tracking GNSS constellations through the SRN 170. The location server 160 may be operable to utilize the collected GNSS satellite data to build a reference database, which may be located internally or externally to the location server 160. The location server 160 may be operable to utilize the collected GNSS satellite data to provide GNSS assistance data to enhance the performance of LBS services provided by the mobile core network 140. In this regard, the location server 160 may be operable to receive various measurement reports from a plurality of associated communication devices. The received measurement reports may comprise, for example, Femtocell measurement reports received from associated Femtocells. Femtocell measurement reports received from a particular Femtocell such as the Femtocell 110 may comprise power measurement of a serving macro base station such as the macro base station 150a as well as neighboring macro base stations such as the macro base stations 150b-150c of the Femtocell 110.

The location server 160 may be operable to identify reference positions detected by the Femtocell 110 based on the corresponding received Femtocell measurement reports. For example, the identified reference positions may correspond to one or more macro base stations detected by the Femtocell 110. The location server 160 may be operable to support both client-assisted Femtocell locating and server-assisted Femtocell locating. In instances where client-assisted Femtocell locating may be utilized, the location server 160 may be operable to compute the location of the Femtocell 110 using the corresponding identified reference positions. The computed location of the Femtocell 110 may be communicated to the Femtocell 110 to be stored in the Femtocell reference database 110a to enhance LBS applications. In instances where server-assisted locating may be utilized, the location server 160 may be operable to communicate the identified reference positions to the Femtocell 110 such that the Femtocell 110 may be operable to calculate its own location using corresponding Femtocell measurements and/or the identified reference positions.

The location server 160 may be operable to communicate information in exemplary formats compatible with telecommunication networks such as GSM/UMTS, LTE and/or WiMAX. For example, the location server 160 may be GSM/UMTS standard compliant by supporting messaging in RRLP format, PCAP interface and/or OMA SUPLv1.0. The location server 160 may be operable to communicate information with standards-based mobile devices such as the mobile devices 112a-112b in exemplary formats compatible with IP traffic over the Internet. The location server 160 may be configured to communicate information with standards-based mobile devices such as the mobile devices 112a-112b via either a user-plane or a control-plane.

The SRN 170 may comprise suitable logic, circuitry, interfaces and/or code that are operable to collect and/or distribute data for GNSS satellites on a continuous basis. The SRN 170 may comprise a plurality of GNSS reference tracking stations located at various different positions around the world to provide A-GNSS coverage all the time in both a home network and/or any visited network.

The GNSS satellites 180a through 180b may comprise suitable logic, circuitry, interfaces and/or code that may be operable to generate and broadcast satellite navigational information in suitable radio-frequency (RF) signals. The broadcast satellite navigational information may be collected by the SRN 170 to be utilized by the location server 160 to support LBS services. The GNSS satellites 180a through 180b may comprise GPS, Galileo, and/or GLONASS satellites.

In an exemplary operation, a standards-based mobile device such as the mobile device 112a may be operable to access mobile services provided by the mobile core network 140 via a Femtocell such as the Femtocell 110 and/or a standard-based macro base station such as the macro base station 150a using air interface protocols specified in, for example, 3GPP, 3GPP2, or WiMAX. In instances where the mobile device 112a is close to the Femtocell 110, the mobile device 112a may be authorized by the Femtocell 110 to access a desired mobile service such as a LBS application provided by the mobile core network 140 via the broadband IP network 120. The core network 140 may be operable to communicate the contents of the LBS application with the broadband IP network 120 via the FGW 130.

The broadband IP network 120 may be operable to deliver the received contents of the LBS application to the mobile device 112a via the Femtocell 110 located in a specific geographical location. The location of the Femtocell 110 may be determined based on Femtocell measurement reports. In this regard, the Femtocell 110 may be operable to carry out power measurements on a serving macro base station and/or one or more neighboring macro base stations. Depending on implementation, the power measurements may be utilized to generate Femtocell measurement reports to be transmitted to the mobile core network 140 via the broadband IP network 120. The mobile core network 140 may be operable to communicate the received Femtocell measurement reports from the Femtocell 110 to the location server 160. The location server 160 may be operable to identify reference positions for the Femtocell 110 based on the received Femtocell measurement reports. Depending on implementation, the location of the Femtocell 110 may be determined either via a server-assisted Femtocell locating or a client-assisted Femtocell locating. In instances where the server-assisted Femtocell locating may be utilized to determine the location of the Femtocell 110, the location server 160 may be operable to calculate the location of the Femtocell 110 using the identified reference positions of the Femtocell 110. The calculated location of the Femtocell 110 may be transmitted, via the broadband IP network 120, to the Femtocell 110 to be stored in the Femtocell location database 110a to enhance LBS applications.

The location server 160 may also be operable to utilize the calculated location of the Femtocell 110 to refine location information of the Femtocell 110 at the location server 160 thereby optimizing LBS performance. In instances where the Femtocell-assisted Femtocell locating may be implemented for determining the location of the Femtocell 110, the location server 160 may be operable to transmit the identified reference positions of the Femtocell 110 to the Femtocell 110 via the broadband IP network 120. The Femtocell 110 may be operable to calculate its own location using corresponding Femtocell measurements and/or the received reference positions of the Femtocell 110. The Femtocell 110 may be operable to utilize the calculated location to enhance LBS applications. The Femtocell 110 may be operable to transmit the calculated location to the location server 160 so as to refine location information of the Femtocell 110 at the location server 160.

Figure 2:
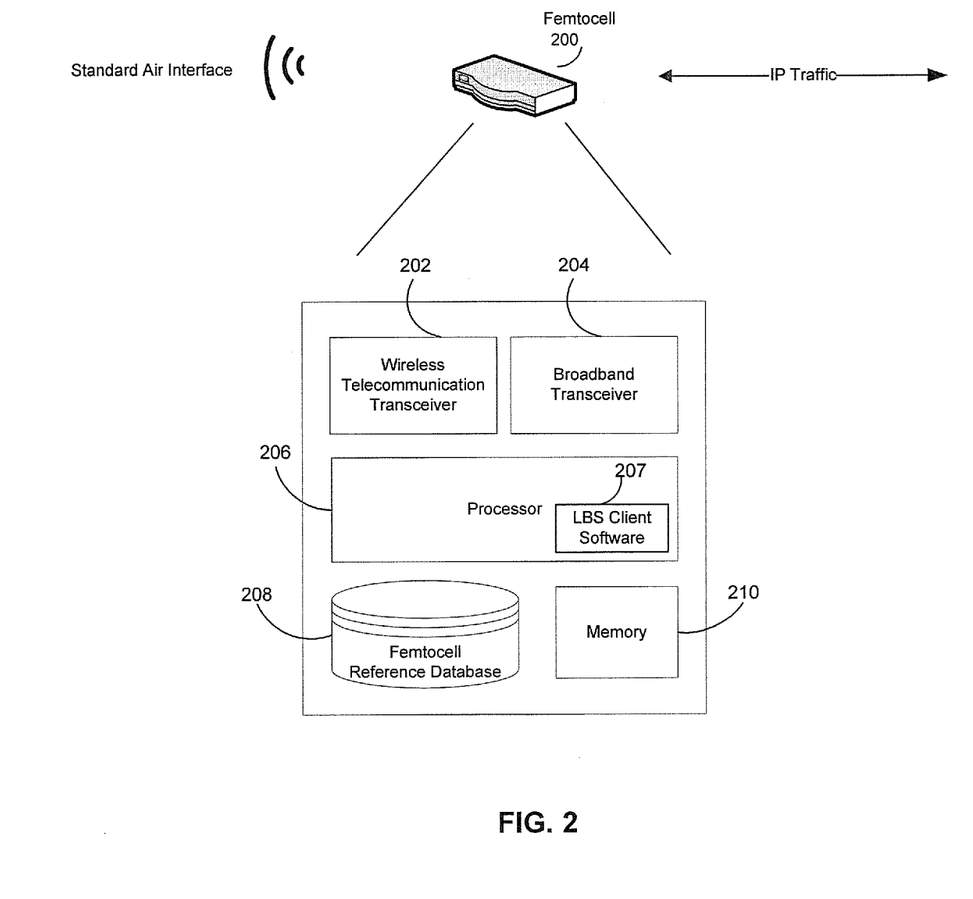
FIG. 2 is a block diagram illustrating an exemplary Femtocell that is operable to generate and deliver measurement reports to a location server to determine the location of the Femtocell, in accordance with an embodiment of the invention.

FIG. 2 is a block diagram illustrating an exemplary Femtocell that is operable to generate and deliver measurement reports to a location server to determine the location of the Femtocell, in accordance with an embodiment of the invention. Referring to FIG. 2, there is shown a Femtocell 200. The Femtocell 200 comprises a wireless telecommunication transceiver 202, a broadband transceiver 204, a processor 206, a Femtocell reference database 208, and a memory 210. The processor 206 comprises LBS client software 207.

The wireless telecommunication transceiver (WTT) 202 may comprise suitable logic, circuitry, interfaces and/or code that may be operable to receive and/or transmit radio frequency signals from and/or to standards-based mobile devices such as the mobile devices 112a-112b using air interface protocols specified in, for example, UMTS, GSM, LTE and/or WiMAX. The WTT transceivers 202 may be operable to transmit and/or receive radio frequency (RF) signals, which may be communicated from/to the processor 206, using various radio frequency technologies specified in, for example, UMTS, GSM, LTE and/or WiMAX.

The broadband transceiver 204 may comprise suitable logic, circuitry, interfaces and/or code that may be operable to transmit voice and/or data in adherence with one or more Internet protocol (IP) broadband standards. The broadband transceiver 204 may be operable to communicate voice and/or data with the broadband IP network 120 over a T1/E1 line, DSL, cable television infrastructure, satellite broadband internet connection, satellite television infrastructure, and/or Ethernet.

The processor 206 may comprise suitable logic, circuitry, interfaces and/or code that may be operable to manage and control operations of the WTT 202 and the broadband transceiver 204. The processor 206 may be operable to duplicate the functionality of a standard-based macro base station such as, for example, 3GPP-based base stations, 3GPP2-based base stations, and/or WiMAX-based base stations. For example, the processor 206 may be operable to establish and maintain connections or links with served standards-based mobile devices such as the mobile devices 112a-112b using air interface protocols specified in, for example, 3GPP, 3GPP2, and/or WiMAX. The processor 206 may be operable to assign air-interface resources such as frequencies and/or time slots to the mobile devices 112a-112b to access mobile services supported by the mobile core network 140.

The processor 206 may be operable to determine and/or control link quality so as to optimize the performance of various mobile services such as a LBS provided by the mobile core network 140. In this regard, the processor 206 may be operable to run the LBS client software 207 to carry out power measurement on a serving macro base station such as the macro base station 150a as well as one or more neighboring macro base stations such as the macro base stations 150b-150c in an associated RAN. The power measurements may be utilized to generate Femtocell measurement reports. The processor 206 may be operable to transmit the generated Femtocell measurement reports to the location server 160 via the broadband transceiver 204. In response, the processor 206 may be operable to receive reference positions of the Femtocell 200 or the location of the Femtocell 200 via the broadband transceiver 204. For example, in instances where server-assisted Femtocell locating may be utilized, the processor 206 may be operable to receive the location of the Femtocell 200, which is calculated by the location server 160 based on the Femtocell measurement reports provided by the Femtocell 200, from the location server 160 via the broadband transceiver 204. In instances where client-assisted Femtocell locating may be utilized, the processor 206 may be operable to receive, from the location server 160, reference positions, which are identified by the location server 160 based on the Femtocell measurement reports provided by the Femtocell 200.

The processor 206 may be operable to calculate the location of the Femtocell 200 using the received reference positions. The processor 206 may be operable to communicate the calculated location to the location server 160 so as to refine or update the location information of the Femtocell 200 at the location server 160. The processor 206 may be operable to support both point-to-point and point-to-multipoint communication via the WTT 202 with standards-based mobile devices such as the mobile devices 112a-112b. The processor 206 may be operable to communicate with the broadband IP network 120 over a wired or wireless connection to provide an IP backhaul support for the Femtocell 200.

The Femtocell reference database 208 may comprise suitable logic, circuitry, interfaces and/or code that may be operable to manage and store data comprising reference positions of the Femtocell 200. The contents in the Femtocell reference database 208 may be used as reference positions for calculating the location of the Femtocell 200. The contents in the Femtocell reference database 208 may be updated as needed, aperiodically, or periodically. The Femtocell reference database 208 may be stored in RAM, ROM, low latency nonvolatile memory such as flash memory and/or other suitable electronic data storage capable of storing data and instructions.

The memory 210 may comprise suitable logic, circuitry, interfaces and/or code that may be operable to store information such as executable instructions and data that may be utilized by the processor 206 and/or other associated component units such as, for example, the WTT 202 and/or the broadband transceiver 204. The memory 210 may be operable to store Femtocell measurement data. The stored Femtocell measurement data may be utilized to generate Femtocell measurement reports to be provided to the location server 160. The memory 210 may be operable to manage and update the stored Femtocell measurement data as needed, aperiodically or periodically. The memory 210 may comprise RAM, ROM, low latency nonvolatile memory such as flash memory and/or other suitable electronic data storage.

In an exemplary operation, the processor 206 may be operable to manage and control operations of the WTT 202 and the broadband transceiver 204 depending on corresponding usages. For example, the processor 206 may be operable to schedule resources, establish and maintain connections or links to support communication with served standards-based mobile devices such as the mobile devices 112a-112b via the WTT 202. The processor 206 may be operable to handle or coordinate the manner in which mobile services are provided by the mobile core network 140 by the broadband transceiver 204. The processor 206 may be operable to manage and/or control link quality to optimize service performance. The processor 206 may be operable to run the LBS client software 207 to perform power measurement on a serving macro base station and/or neighboring macro base stations. The processor 206 may be operable to store the power measurement data into the memory 210. The stored power measurement data may be utilized to generate Femtocell measurement reports to be transmitted to the location server 160 via the broadband transceiver 204. In instances where a server-assisted Femtocell locating scheme may be utilized, the processor 206 may be operable to receive the location of the Femtocell 200 from the location server 160 via the broadband transceiver 204. In instances where a client-assisted Femtocell locating scheme may be utilized, the processor 206 may be operable to receive reference positions of the Femtocell 200 from the location server 160. For example, the received reference positions may correspond to one or more macro base stations detected by the Femtocell 200. The processor 206 may be operable to calculate the location of the Femtocell using the reference positions received from the location server 160. The calculated location of the Femtocell 200 may be utilized to support and/or optimize LBS applications. The calculated location of the Femtocell 200 may be communicated to the location server 160 so as to update or refine the location information of the Femtocell 200.

Figure 3:
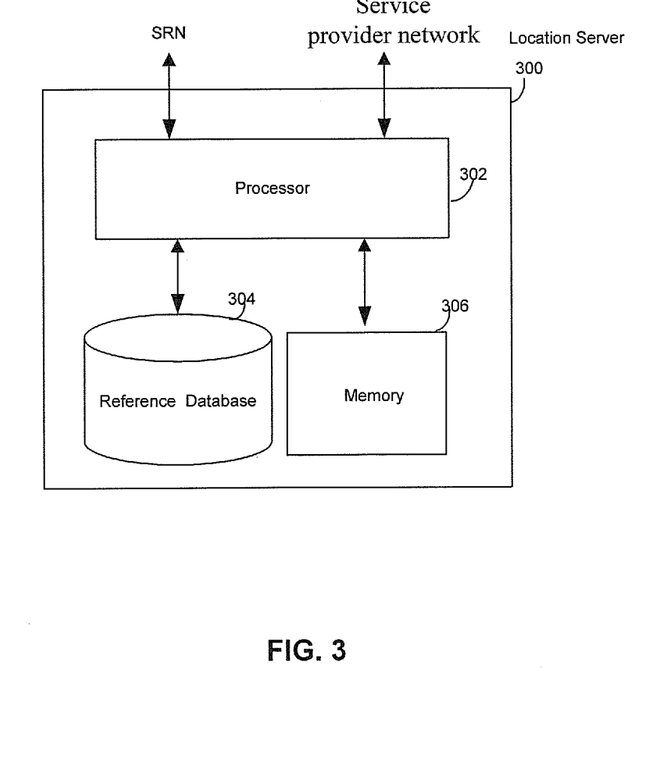
FIG. 3 is a block diagram illustrating an exemplary location server that is operable to locate a Femtocell based on corresponding measurement reports, in accordance with an embodiment of the invention.

FIG. 3 is a block diagram illustrating an exemplary location server that is operable to locate a Femtocell based on corresponding measurement reports, in accordance with an embodiment of the invention. Referring to FIG. 3, there is shown a location server 300. The location server 300 may comprise a processor 302, a reference database 304 and a memory 306.

The processor 302 may comprise suitable logic, circuitry, interfaces and/or code that may be operable to manage and/or control operations of the reference database 304 and the memory 306. The processor 302 may be operable to receive Femtocell measurement reports from Femtocells in corresponding geographic regions served. Femtocell measurement reports received from a Femtocell such as the Femtocell 110 in a specific geographic region may comprise, for example, power measurement on a serving macro base station and the neighboring macro base stations of the Femtocell 110. The processor 302 may be operable to identify reference positions for the Femtocell 110. For example, the identified reference positions may correspond to one or more macro base stations detected by the Femtocell 110. Both server-assisted and client-assisted Femtocell locating may be supported. In instances where a server-assisted Femtocell locating may be utilized, the processor 302 may be operable to calculate the location of the Femtocell 110 using the identified reference positions. The calculated location of the Femtocell 110 may be utilized to refine or update the location information of the Femtocell 110 in the reference database 304. The calculated location of the Femtocell 110 may be communicated to the Femtocell 110 over the broadband IP network 120 to optimize LBS performance. In instances where a client-assisted Femtocell locating may be utilized, the processor 302 may be operable to communicate the identified reference positions of the Femtocell 110 to the Femtocell 110 over the broadband IP network 120. The processor 302 may be operable to receive the location of the Femtocell 110 to enhance LBS performance. The processor 302 may also be operable to utilize the received location of the Femtocell 110 to update the location information of the Femtocell 110 in the reference database 304.

The reference database 304 may comprise suitable logic, circuitry, interfaces and/or code that may be operable to store location information of associated communication devices such as, for example, standards-based mobile devices such as the mobile devices 112a-112b, standard-based macro base stations such as the macro base stations 150a-150c and a plurality of Femtocells such as the Femtocell 110. The stored location information may be provided to associated communication devices such as the Femtocell 110 to support LBS applications. The location database 304 may be operable to manage and update the stored location information when need, aperiodically or periodically.

The memory 306 may comprise suitable logic, circuitry, interfaces and/or code that may be operable to store information such as executable instructions and data that may be utilized by the processor 302 and/or other associated component units such as, for example, the reference database 304. The memory 306 may comprise RAM, ROM, low latency nonvolatile memory such as flash memory and/or other suitable electronic data storage.

In an exemplary operation, the processor 302 may be operable to receive Femtocell measurement reports from, for example, the Femtocell 110 in a specific geographic area. One or more reference positions may be identified for the Femtocell 110 from the reference database 304 based on the received Femtocell measurement reports. In instances where server-assisted Femtocell locating may be utilized, the processor 302 may be operable to utilize the identified reference positions to calculate the location of the Femtocell 110. The location information for the Femtocell 110 in the reference database 304 may be updated or refined using the calculated location of the Femtocell 110. The calculated location of the Femtocell 110 may be communicated to the Femtocell 110 over the broadband IP network 120 to enhance LBS applications when need. In instances where a client-assisted Femtocell locating may be utilized, the processor 302 may be operable to communicate the identified reference positions of the Femtocell 110 to the Femtocell 110 over the broadband IP network 120 for calculating the location of the Femtocell 110 at the Femtocell 110. The processor 302 may be operable to receive the location of the Femtocell 110 so as to update or refine the corresponding location information within the reference database 304. The processor 302 may be operable to utilize the updated location information in the reference database 304 to enhance Femtocell locating so as to optimize LBS performance.

Figure 4:
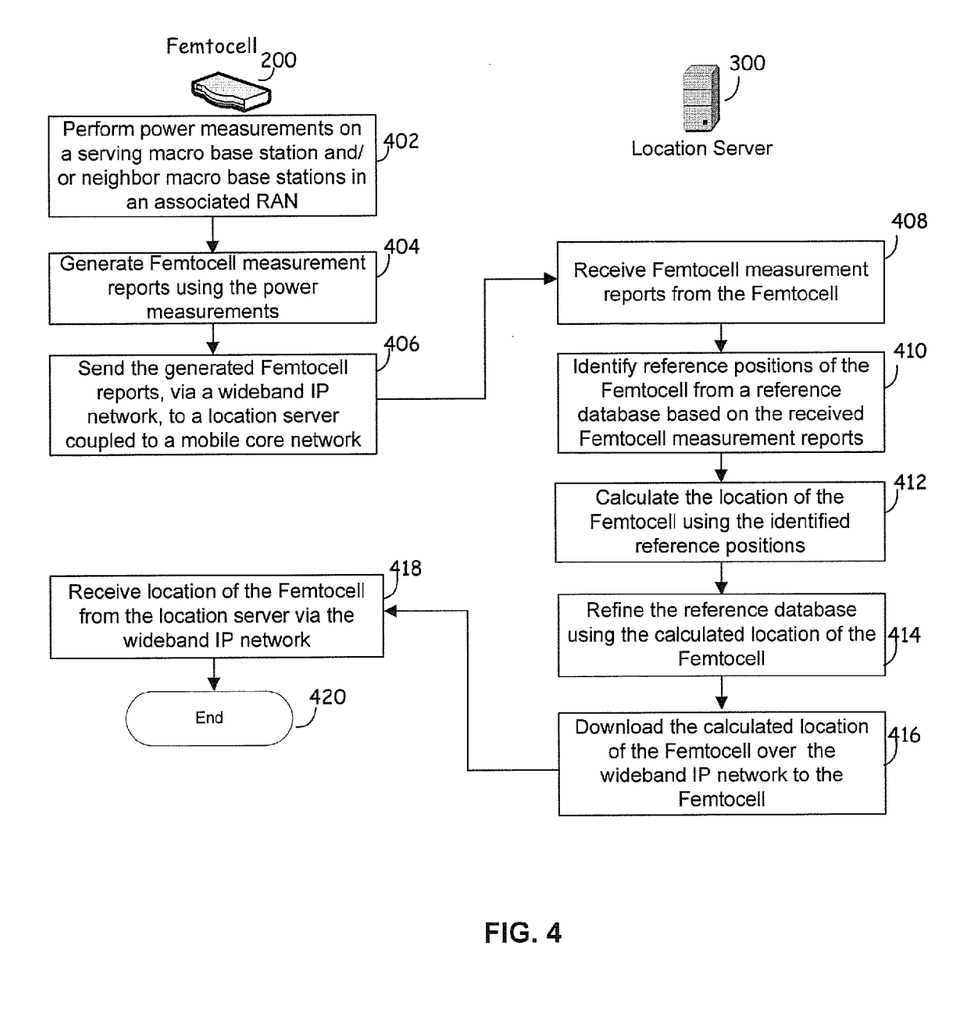
FIG. 4 is a flow chart illustrating an exemplary client-assisted Femtocell locating procedure, in accordance with an embodiment of the invention.

FIG. 4 is a flow chart illustrating an exemplary client-assisted Femtocell locating procedure, in accordance with an embodiment of the invention. Referring to FIG. 4, the exemplary steps may start with step 402. In step 402, the Femtocell 200 may be operable to perform power measurements on a serving macro base station such as the macro base station 150a and/or neighboring macro base stations such as the macro base stations 150b-150c in an associated RAN specified in, for example, GSM, UMTS, CDMA, LTE and/or WiMAX. In step 404, the Femtocell 200 may be operable to generate Femtocell reports using the power measurements. In step 406, the Femtocell 200 may be operable to send the generated Femtocell reports to a location server such as the location server 300 coupled to the mobile core network 140 via the broadband IP network 120.

In step 408, the location server 300 may be operable to receive Femtocell measurement reports from the Femtocell 200. In step 410, the location server 300 may be operable to identify one or more reference positions from the reference database 304 for the Femtocell 200 based on the received Femtocell measurement reports. In step 412, the location server 300 may be operable to calculate the location of the Femtocell 200 using the identified reference positions. In step 414, the reference database 304 may be refined or updated using the calculated location of the Femtocell 200. In step 416, the location server 300 may be operable to download the calculated location of the Femtocell 200 over the wideband IP network 120 to the Femtocell 200. In step 418, the Femtocell 200 may be operable to receive the location of the Femtocell 200 from the location server 300 via the wideband IP network 120. The exemplary steps may end in step 420.

Figure 5:
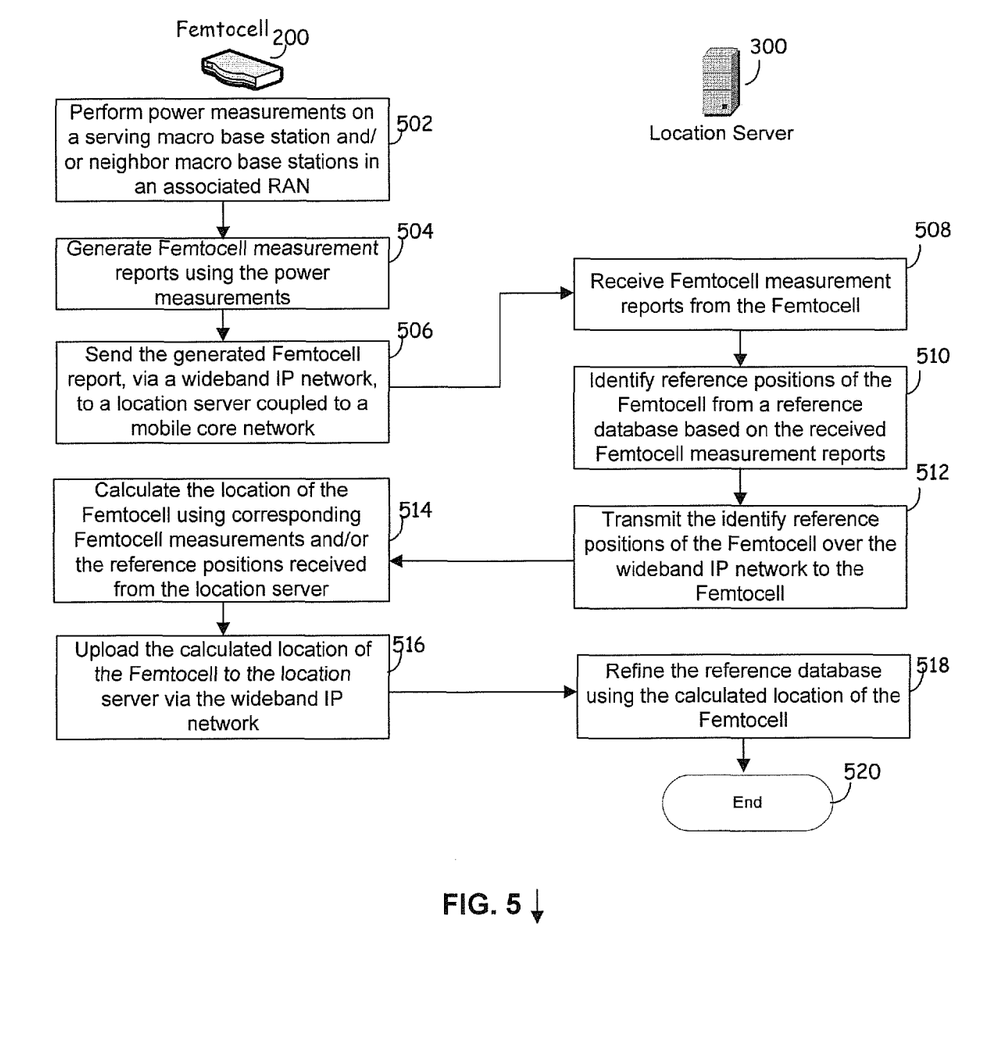
FIG. 5 is a flow chart illustrating an exemplary server-assisted Femtocell locating procedure, in accordance with an embodiment of the invention.

FIG. 5 is a flow chart illustrating an exemplary server-assisted Femtocell locating procedure, in accordance with an embodiment of the invention. Referring to FIG. 5, the exemplary steps 502-510 may operate similar to the operations in the steps 402-410 as described with respect to FIG. 4. In step 512, the location server 300 may be operable to transmit the identified reference positions of the Femtocell 200, via the wideband IP network 120, to the Femtocell 200. In step 514, the Femtocell 200 may be operable to calculate its own location using corresponding Femtocell measurements and/or the reference positions received from the location server 300. For example, the received reference positions may correspond to one or more macro base stations detected by the Femtocell 200. In step 516, the Femtocell 200 may be operable to upload the calculated location of the Femtocell 200 to the location server 300 via the wideband IP network 120. In step 518, the location server 300 may be operable to refine or update the reference database 304 using the calculated location of the Femtocell 200. The exemplary steps may end in step 520.

In various exemplary aspects of the method and system for locating a Femtocell using measurement reports, a Femtocell such as the Femtocell 110 may be operable to perform or carry out power measurements on a serving macro base station such as the macro base station 150a and/or one or more neighboring macro base stations such as the macro base stations 150b-150c in a radio access network (RAN). in the RAN may comprise, for example, a 3GPP, a 3GPP2 and/or a WiMAX compliant network. The Femtocell 110 may be operable to transmit the power measurements over the broadband IP network 120 to the location server 160. The location server 160 is coupled to the mobile core network 140 to which the radio access network is associated. The Femtocell 110 may be operable to receive location information related to the Femtocell 110 from the location server 160 over the broadband IP network 120. The received location information related to the Femtocell 110 may comprise one or more reference positions corresponding to macro base stations detected by the Femtocell 110 and/or an actual location of the Femtocell 110. The Femtocell 110 may be operable to generate measurement reports using the measurements so as to determine the location of the Femtocell 110. The Femtocell 110 may be operable to transmit the generated measurement reports to the location server 160 over the broadband IP network 120. The location server 160 may be operable to identify the one or more reference positions corresponding to macro base stations detected by the Femtocell 110 from the reference database 304 based on the measurement reports received from the Femtocell 110. As described, for example with respect to FIG. 4, in instances where a client-assisted Femtocell locating may be utilized, the Femtocell 110 may be operable to receive the identified one or more reference positions corresponding to macro base stations detected by the Femtocell 110 from the location server 304 over the broadband IP network 120. The Femtocell 110 may be operable to calculate the location of the Femtocell 110 using the received one or more reference positions corresponding to macro base stations detected by the Femtocell 110. The Femtocell 110 may be operable to transmit the calculated location of the Femtocell 110 to the location server 160. The location server 160 may be operable to utilize the calculated location of the Femtocell 110 to update the reference database 304. As described with respect to FIG. 5, in instances where a server-assisted Femtocell locating may be utilized, the location server 160 may be operable to calculate the location of the Femtocell 160 using the identified one or more reference positions of the Femtocell 110. The location server 160 may be operable to update the reference database 304 using the calculated location of the Femtocell 110. The location server 160 may be operable to transmit the calculated location of the Femtocell 110 to the Femtocell 110 over the broadband IP network 120.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for locating a Femtocell using measurement reports.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for calculating location information indicating the geographic location of a femtocell in a radio access network, comprising:
    performing power measurements, by a femtocell, of one or more base stations in a radio access network;
    generating, at the femtocell, a measurement report from the power measurements;
    transmitting, from the femtocell, the measurement report over a broadband Internet Protocol (IP) network to a location server connected to an associated mobile core network;
    receiving, at the femtocell, location information based on the measurement report that indicates the geographic location of the femtocell from the location server over the broadband IP network;
    storing, at the femtocell, the location information indicating the geographic location of the femtocell; and
    using, at the femtocell, the measurement report for radio resource management,
    wherein the power measurements include intra-frequency measurements, inter-frequency measurements, and inter-RAT measurements.

2. The method according to claim 1, wherein the radio access network is specified in at least one of 3rd Generation Partnership Project (3GPP), 3rd Generation Partnership Project 2 (3GPP2), and Worldwide Interoperability for Microwave Access (WiMAX).

3. The method according to claim 1, wherein the performing power measurements comprises performing power measurements of a serving base station and one or more neighboring base stations of the femtocell in the radio access network.

4. The method according to claim 1, wherein the location server identifies one or more reference positions corresponding to the one or more base stations based on the measurement report received from the femtocell, and calculates the location information indicating the geographic location of the femtocell based on the measurement report.

5. The method according to claim 4, further comprising:
    retrieving, by the location server, the identified reference positions corresponding to the one or more base stations from a reference database in the location server.

6. The method according to claim 5, further comprising:
    updating the reference database in the location server based on the calculated location information indicating the geographic location of the femtocell.

7. A system for calculating location information indicating the geographic location of a femtocell in a radio access network, the system comprising:
    a femtocell configured to:
        perform power measurements of one or more base stations in a radio access network;
        generate a measurement report from the power measurements;
        transmit the measurement report over a broadband Internet Protocol (IP) network to a location server connected to an associated mobile core network;
        receive one or more reference positions of the one or more base stations from the location server over the IP network, the one or more reference positions based on the measurement report;
        calculate location information indicating the geographic location of the femtocell using the one or more reference positions of the one or more base stations;
        store the location information indicating the geographic location of the femtocell; and
        use the measurement report for radio resource management.

8. The system according to claim 7, wherein the radio access network is specified in at least one of 3rd Generation Partnership Project (3GPP), 3rd Generation Partnership Project 2 (3GPP2), and Worldwide Interoperability for Microwave Access (WiMAX).

9. The system according to claim 7, wherein the power measurements comprise power measurements from a serving base station and one or more neighboring base stations of the femtocell in the radio access network.

10. The system according to claim 7, wherein the location server is configured to identify the one or more reference positions of the one or more base stations based on the measurement report generated by the femtocell.

11. The system according to claim 10, wherein the femtocell is further configured to retrieve the one or more reference positions of the one or more base stations from a reference database in the location server.

12. The system according to claim 11, wherein the femtocell is further configured to transmit the calculated location information indicating the geographic location of the femtocell to the location server over the broadband IP network.

13. The system according to claim 7, wherein the power measurements include intra-frequency measurements, inter-frequency measurements, and inter-RAT measurements.

14. A method for calculating location information indicating the geographic location of a femtocell in a radio access network, comprising:
performing power measurements, by a femtocell, of one or more base stations in a radio access network;
generating, at the femtocell, a measurement report from the power measurements;
transmitting, from the femtocell, the measurement report over a broadband Internet Protocol (IP) network to a location server connected to an associated mobile core network;
receiving, at the femtocell, one or more reference positions of the one or more base stations from the location server over the IP network, the one or more reference positions based on the measurement report;
calculating, at the femtocell, location information indicating the geographic location of the femtocell using the received reference positions of the one or more base stations;
storing, at the femtocell, the location information indicating the geographic location of the femtocell; and
using, at the femtocell, the measurement report for radio resource management.

15. The method according to claim 14, wherein the location server identifies the one or more reference positions of the one or more base stations based on the measurement report transmitted by the femtocell.

16. The method according to claim 14, further comprising:
retrieving the one or more reference positions of the one or more base stations from a reference database in the location server.

17. The method according to claim 14, further comprising:
transmitting, from the femtocell, the location information indicating the geographic location of the femtocell to the location server over the broadband IP network.

18. The method according to claim 14, further comprising:
storing, at the femtocell, the one or more reference positions of the one or more base stations in a reference database.

19. The method according to claim 14, wherein the power measurements include intra-frequency measurements, inter-frequency measurements, and inter-RAT measurements.

* * * * *